United States Patent [19]

Schreyer et al.

[11] 4,265,181

[45] May 5, 1981

[54] ROLLING BEARING WHEEL AND HUB SUPPORT COMBINATION

[75] Inventors: Kenneth D. Schreyer, Clarence; Earl T. Leverentz, North Tonawanda; Thomas R. Nusz, Amherst; Reuben P. Benton, North Tonawanda, all of N.Y.

[73] Assignee: Columbus McKinnon Corporation, Tonawanda, N.Y.

[21] Appl. No.: 959,679

[22] Filed: Nov. 13, 1978

[51] Int. Cl.³ .......................................... B61B 13/00
[52] U.S. Cl. ........................................ 105/150; 16/98; 104/93; 104/95; 105/154; 308/190
[58] Field of Search ....................... 104/89, 93, 94, 95, 104/244; 105/148, 150, 154, 155; 16/46, 87.6 R, 87.6W, 87.8, 91, 97, 98; 295/44; 308/195, 187.2, 190

[56] References Cited

U.S. PATENT DOCUMENTS

| 1,392,912 | 10/1921 | Chesnutt | 16/46 |
|---|---|---|---|
| 1,446,463 | 2/1923 | Hoffman | 105/154 |
| 2,417,239 | 3/1947 | Courtney | 308/190 X |
| 2,920,918 | 1/1960 | Nojima | 104/244 X |
| 3,072,075 | 1/1963 | Nojima | 295/44 X |
| 3,171,697 | 3/1965 | Nicolaides | 308/195 X |
| 3,602,150 | 8/1971 | Frost | 104/94 X |
| 3,869,181 | 3/1975 | Barber | 308/187.2 |

FOREIGN PATENT DOCUMENTS

| 109814 | 4/1925 | Switzerland | 105/154 |
|---|---|---|---|
| 1394640 | 5/1975 | United Kingdom | 104/93 |

*Primary Examiner*—Randolph A. Reese
*Attorney, Agent, or Firm*—Bean, Kauffman & Bean

[57] ABSTRACT

A rolling bearing type traction wheel and hub assembly which is especially adapted to ride upon either flat (i.e. horizontal) or laterally sloping surfaces such as trolley trackways and/or the opposite side flanges of supporting I-beams or the like; the axis of wheel rotation being in any case canted relative to the support surface. The wheel assembly comprises a generally cylindrical shaped inner bearing race/hub member which is fixed to an external support and is encircled by a rotatable outer race/wheel member, with rolling bearings enclosed therebetween. The wheel and hub parts are formed of sheet material and are so shaped as to novelly facilitate initial assembly thereof. When the device is operating under load the parts automatically float into self-aligning operational relationship and are retained in proper operative relationship without need of any auxiliary retention device.

9 Claims, 9 Drawing Figures

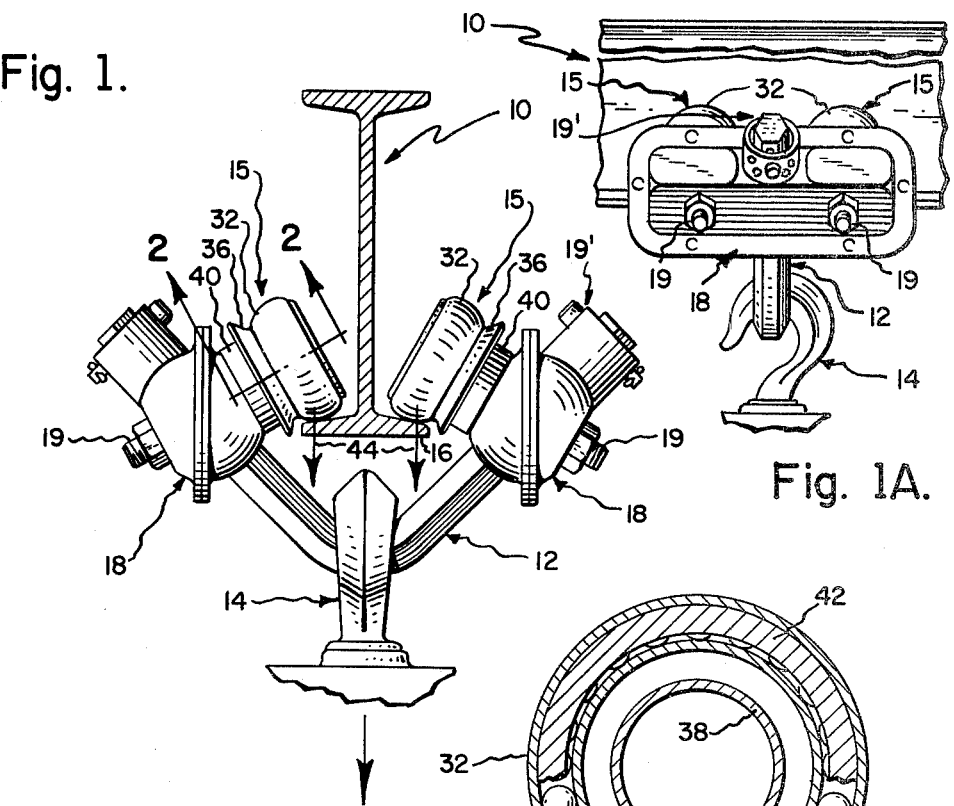
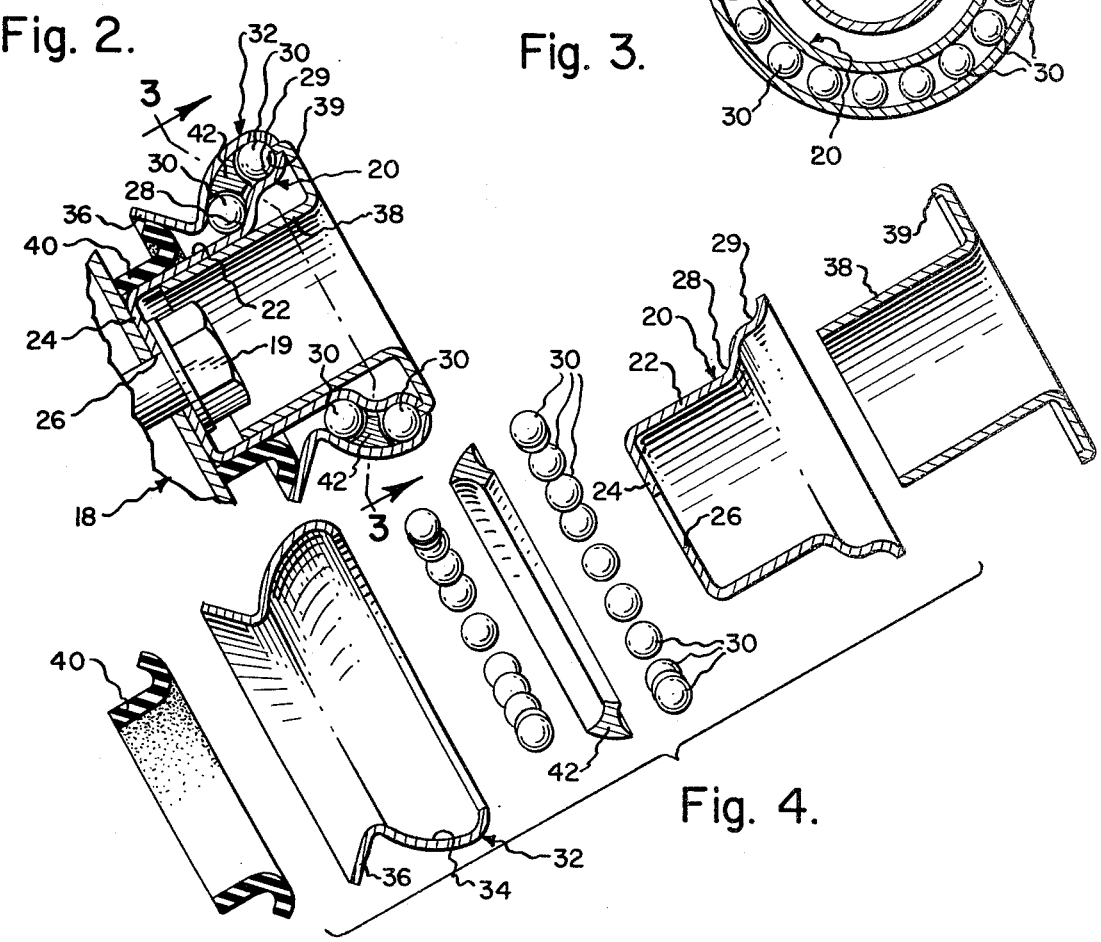

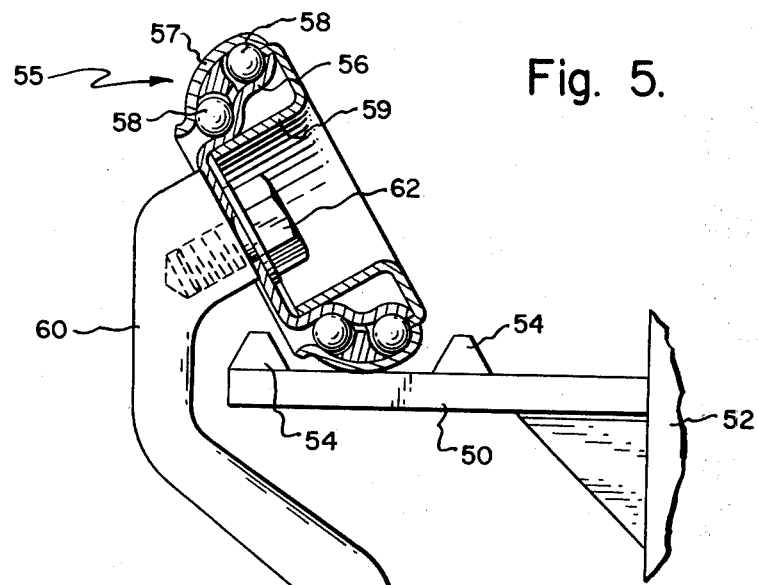
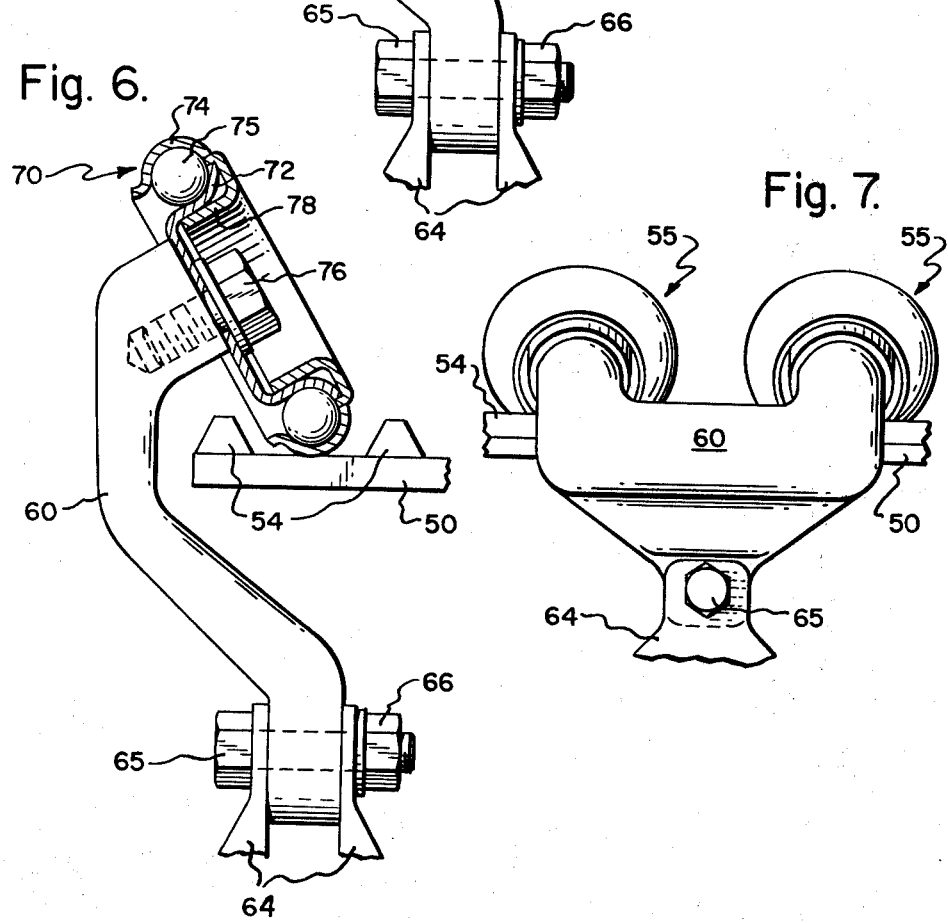
Fig. 5.
Fig. 6.
Fig. 7.

ROLLING BEARING WHEEL AND HUB SUPPORT COMBINATION

BACKGROUND OF THE INVENTION

This invention relates to rolling bearing type wheel assemblies such as for example are used in overhead trolley conveyor systems and/or the like. Such systems sometimes employ oppositely paired trolley wheels subtended by a yoke device from which the load suspends; the trolley wheels being thus arranged to roll along support rails; the bottom flanges of I-beams; or the like. They also sometimes employ single in-line trackways on which the load carrying trolley rolls. Prior wheel devices for such purposes typically employ auxiliary retention means to positively maintain the inner and outer race members and bearings of the assembly in proper operative relation; whereas in the case of the present invention the wheels and hubs (race members) are so shaped as to automatically maintain themselves as well as the bearings in proper self-alignment, when the wheels are under load. Also, the invention provides a novel ease of initial assembly technique.

An object of the present invention is to provide an improved rolling bearing wheel for the above referenced purposes which may be fabricated of fewer parts while at the same time providing a wheel which is self-maintaining in optimum operating condition.

Another object is to provide an improved wheel as aforesaid, the bearing race members of which are readily fabricated of sheet metal or the like.

Another object is to provide an improved wheel as aforesaid, the parts of which are so shaped and relatively arranged when assembled that they automatically tend to float into and maintain proper operational relationships when under load; instead of tending to ride out of proper operational relationship when under load.

Other objects and advantages of the invention will appear from the accompanying specification and drawings wherein:

BRIEF DESCRIPTION OF THE DRAWINGS

FIG. 1 is an end elevational view of a trolley construction employing wheels and support system of the present invention; the trolley being shown as being mounted for rolling along the bottom flanges of an I-beam and carrying therebelow a load hook or the like;

FIG. 1-A is a side elevational view of the trolley of FIG. 1;

FIG. 2 is an enlarged scale fragmented sectional view, taken as suggested by line 2—2 of FIG. 1;

FIG. 3 is a sectional view taken as along line 3—3 of FIG. 2;

FIG. 4 is an "exploded" view, illustrating the steps of assembling a wheel of the invention;

FIG. 5 is a view corresponding to FIG. 1, partly in elevation and partly in section; showing application of the wheel and support system of FIG. 1 to a trolley arrangement employing a single flat surfaced wheel track;

FIG. 6 is a view corresponding to FIG. 5 showing a modified form of wheel construction;

FIG. 7 is a side elevational view of a paired wheel trolley unit employing wheels of the types shown in either FIG. 5 or FIG 6.

DETAILED DESCRIPTION OF PREFERRED EMBODIMENTS

Figure 8:
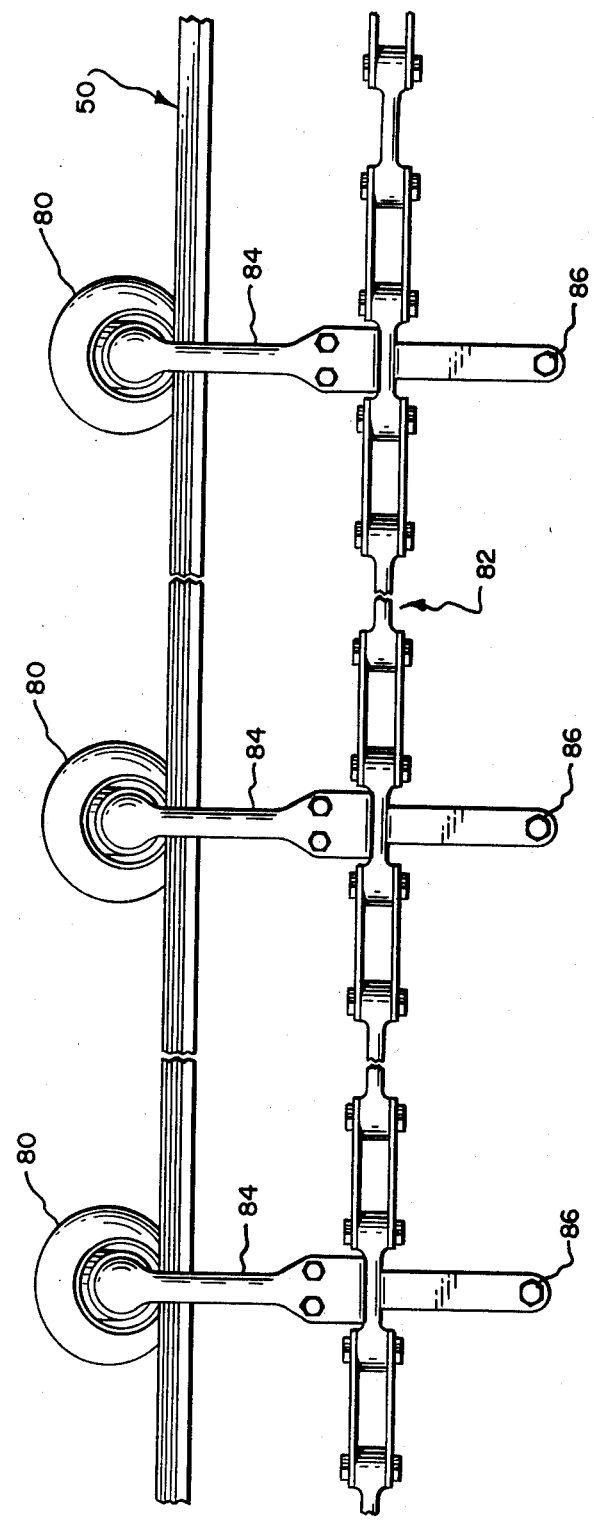
FIG. 8 is a side elevational view of a trolley system singly employing wheels of the invention at spaced intervals along the conveyor system.

As shown herein by way of example at FIGS. 1 and 1-A the wheel of the present invention is illustrated as being employed in an overhead trolley system arranged to travel along the bottom flanges of an I-beam or the like such as is designated 10. As shown, the trolley system comprises a yoke bar 12 from which suspends a load carrying hook 14. Each of the opposite legs of the yoke bar carries a pair of wheels 15 of the present invention so that the wheels support the yoke bar and its depending load while rolling along the upper planar surfaces of the bottom flanges 16 of the I-beam; the axes of wheel rotation being canted in either case relative to the planes of the supporting surfaces, i.e. laterally inclined downwardly and outwardly relative to such planes. In the example shown the wheels are carried by the yoke bar by means of housings 18 and bolts 19; but it is to be understood that the wheels may be mounted relative to the load suspension device by any other suitable means including a device such as shown at 19' for locking the wheels to the yoke bar.

One form of the wheel of the invention is illustrated in detail at FIGS. 2 and 3. As shown therein each wheel comprises a combination hub and inner rolling bearing race member 20 which is of generally cup-shaped form comprising a cylindrical side wall portion 22 and bottom plate portion 24 which is apertured as indicated at 26 to accommodate therethrough the shank portion of the fastener 19. Thus it will be seen that the hub member 20 may be locked firmly in position upon the housing 18 (or upon any other suitable portion of the load suspension system).

At its outer end the cylindrical wall portion 22 of the hub 20 is outwardly flared in double reversing curve sectional form, thereby providing two separate circumferential valleys 28, 29 for receiving in each case a gang of ball bearings 30—30. As illustrated, the valleys 28, 29 have internal profiles that are complementary to the external profiles of the ball bearings. The combination wheel and outer bearing race member of the assembly is generally designated 32 and as best shown in FIGS. 2, 4 comprises a generally cylindrical, cup-shaped member open at each end and including a concave-sectioned wall portion 34 which is shaped so as to circumscribe the two rows of ball bearings 30 when the wheel parts are in assembled relation as illustrated at FIGS. 2, 3. As illustrated, the inner profile of wall portion 34 is complementary in shape to the external profile of the ball bearings. Additionally, the wheel member 32 is preferably formed with an outwardly flaring flange portion 36, extending therefrom so as to guide the wheel laterally relative to the side edge of the I-beam flange when rolling thereon. A grease seal as shown at 40 is included in the assembly, and a combination dirt and cushion seal 38 is also provided. The member 38 includes along its outer periphery a reverse curved flange portion 39 which fits in between the outer mating peripheries of the bearing race members 20-32. A bearing divider ring 42 may also be included in the assembly. Preferably, the seal members 38, 40 are formed of some suitable elastomeric material, so as to be adapted to be press-fitted into and elastically self-retaining in the assembly.

FIG. 4 illustrates how the wheel parts of the invention may be easily assembled. The two rows of the ball bearings (with the divider ring therebetween) are simply packed as a unit with grease, and are then stacked into the concave portion of the wheel member 32. The hub member is thereupon lowered telescopically into the wheel member and into the assembled relationship shown in FIG. 2, whereby the ball bearings 30 are disposed in the valley portions 28, 29 of the hub member. The seal devices 38, 40 are then press-fitted into the assembly, and the assembly is then ready to be locked onto its support such as by device 19.

It is to be noted that when the trolley is in operation as shown at FIG. 1, the trolley load is carried by the wheels 15—15 in such manner as to be free to roll along the flanges of the I-beam while the load forces carried by each wheel are indicated by force lines 44—44; and that the load force lines 44—44 pass vertically through the wheel/hub and ball bearing members in such manner that the wheel 32 tends to automatically float into proper operational relationship with the ball bearings and the hub 20. Thus, no auxiliary bearing retention means is required.

The flange portion 39 of the seal member 38, being of elastic material provides a dirt/dust seal between the opposing outer end edges of the members 20-32, while the elastic seal member 40 similarly provides an elastic grease/dirt seal between the hub and wheel members below the bearings 30. The seal member 40 bottoms on the support 18, and thus resiliently biases the wheel member 32 outwardly and generally in properly operative position; while at the same time the seal members 39-40 accommodate minor shiftings of the wheel relative to the hub while maintaining their sealing functions. Thus, the wheel assembly is of improved performance and longevity characteristics because no influences are present such as would prevent the wheel tread member from automatically floating on its bearings in optimum operative positions.

FIGS. 5, 6, 7 illustrate applications of the invention to a single track trolley system such as typically employ laterally hanging brackets which are rollingly supported on the trackway by a pair of trackway aligned wheels; the lower end of the bracket engaging the load being conveyed. Note that as shown in FIGS. 5-7, such a trolley arrangement typically runs along an upper planar trackway surface provided by a flat or horizontal structure 50 cantilever-supported such as by a vertical wall, posts, or the like 52; and that preferably wheel travel guide flanges 54—54 or the like will be provided integrally with the trackway.

FIGS. 5 and 7 illustrate how a pair of wheels 55—55 such as are shown in detail at FIGS. 2, 3, 4 may be employed in a single line trackway conveyor system. As shown in FIG. 5, each wheel comprises an inner rolling bearing race (hub) member 56 and an outer race member 57, enclosing therebetween two rows of ball bearings 58—58. The hub members 56 are locked upon the upper ends of the bracket 60 as illustrated at 62 (FIG. 5). As best shown at FIG. 7 the bracket 60 carries at its lower end the conveyor loadings as shown at 64 such as by means of a bolt and nut connection 65-66.

FIGS. 6, 7 also illustrate how a wheel 70 of the invention may be constructed to employ only a single row of ball bearings. In this case the inner race (hub) member is illustrated at 72; the outer race member at 74; and the single row of ball bearings at 75. As in the case of FIG. 5, the hub member is anchored to the bracket 60 as by means of a machine screw 76 or the like. In any case dirt/grease seals may be provided as explained in association with the descriptions of FIGS. 2-4, as depicted at 78 in FIG. 6.

As shown at FIG. 8, single wheels of the invention as designated 80 may be employed at spaced intervals along and to support a conveyor chain system designated 82; the wheels 80 being either of the types shown at FIGS. 2, 5, or 6. In any such case the wheels will be mounted upon hub support devices 84 such as are shown in FIGS. 1, 5, 6; so as to carry therebelow load engaging means such as are shown at 86 (FIG. 8). The load train thereby suspended below the conveyor automatically stabilizes the load system as illustrated in FIG. 8; whether in motion or static. In such case only singly mounted wheels of the invention need be employed.

What is claimed is:

1. An overhead trackway and rolling trolley combination comprising:
   a trackway having an upper planar wheel tracking surface;
   a rolling bearing wheel and support assembly therefor arranged to run along said trackway surface;
   said assembly including a load carrying and wheel support means; a wheel hub member anchored to said support means and comprising an inner race member defining an axis for rotation thereabout which is laterally inclined downwardly and outwardly relative to the plane of said trackway surface; an outer race wheel tread member enclosing said inner race hub member in spaced relation therefrom; and rolling bearing means disposed between said inner race hub and outer race wheel tread members, whereby said outer race wheel tread member is adapted to roll upon said trackway surface about said hub member;
   said race members being fabricated from sheet material in the regions of their rolling bearing contact surfaces and having internal profiles in such regions which are complementary to the profiles of such rolling bearing means, whereby the spacing between said members permits limited relative floating movement therebetween when the wheel assembly is in its operative position while still maintaining contact between said rolling bearing means and said regions of said race members.

2. A combination as set forth in claim 1, wherein said inner and outer race members are formed of sheet metal material.

3. A combination as set forth in claim 1, wherein said rolling bearing means are of the ball bearing type.

4. A combination as set forth in claim 1, wherein said rolling bearing means comprise two separate rows of ball bearings disposed in parallel relationship.

5. A combination as set forth in claim 4, wherein a separate ring-shaped divider is disposed between said rows of bearings and having peripheral surfaces generally conforming in shape to said bearings.

6. A combination as set forth in claim 4, wherein said inner race member is of double reverse curve sectional form and said outer race member is substantially of concave wall form, whereby to automatically confine said rows of bearings in their separated operative positions.

7. A combination as set forth in claim 1, wherein said bearing means are packed in grease, and wherein grease and dirt seals are provided at opposite ends of said assembly.

8. A combination as set forth in claim 1, wherein said outer race member includes an integral outwardly flaring bottom flange adjacent said rolling bearings means for lateral guidances of the rollings of said wheel and for providing a clearance space between said flange and said inner race member.

9. A combination as set forth in claim 1 including at the opposite peripheral ends of said outer race member elastic seal devices enclosing the annular space between said inner and outer race members while accommodating minor shiftings of the positional relationship of said outer member relative to said inner member, one of said seal devices biasing said outer race member into proper engagement with said rolling bearing means.

* * * * *